United States Patent
Kludas et al.

(10) Patent No.: US 7,946,044 B2
(45) Date of Patent: May 24, 2011

(54) SURVEYING INSTRUMENT AND A METHOD THEREFOR

(75) Inventors: Torsten Kludas, Zottelstedt (DE); Uwe Beyer, Jena (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 12/885,147

(22) Filed: Sep. 17, 2010

(65) Prior Publication Data
US 2011/0067250 A1 Mar. 24, 2011

(30) Foreign Application Priority Data
Sep. 18, 2009 (DE) .......................... 10 2009 042 123

(51) Int. Cl.
G01C 15/00 (2006.01)
G01C 9/08 (2006.01)
G01B 11/26 (2006.01)
(52) U.S. Cl. ..................................... 33/291; 356/139.1
(58) Field of Classification Search ................... 33/291; 356/139.1, 138
See application file for complete search history.

(56) References Cited

U.S. PATENT DOCUMENTS

| 6,675,489 B2 * | 1/2004 | Ohtomo et al. ................. 33/290 |
| 6,848,188 B2 * | 2/2005 | Tacklind et al. ................. 33/290 |
| 7,388,658 B2 | 6/2008 | Glimm |
| 2010/0149524 A1 | 6/2010 | Mayer et al. |

FOREIGN PATENT DOCUMENTS
EP  2 133 659 A1  12/2009

OTHER PUBLICATIONS
Office Action of German Patent Application 10 2009 042 123.8, dated Mar. 11, 2010, 6 pages total. [English Translation Included].

* cited by examiner

*Primary Examiner* — Christopher W Fulton
(74) *Attorney, Agent, or Firm* — Kilpatrick Townsend & Stockton LLP (57) ABSTRACT

A surveying instrument includes a measuring system having a component, a support, and a mounting unit that is arranged at the support. The component is mounted on the mounting unit and the support and the mounting unit are configured such that the mounting unit is adjustable relative to the support. The instrument also includes a fine inclination sensor that is arranged at the component and is configured to measure an inclination angle of the component and to output fine inclination data. The instrument further includes a coarse inclination sensor that is arranged at the component, is configured to measure the inclination angle and to output coarse inclination data, and includes an electronic acceleration sensor. The instrument additionally includes an evaluation unit that is configured to select inclination data from the coarse inclination data and the fine inclination data and an output unit that is configured to output the inclination data.

16 Claims, 6 Drawing Sheets

SURVEYING INSTRUMENT AND A METHOD THEREFOR

CROSS-REFERENCES TO RELATED APPLICATIONS

The present application claims priority to German Patent Application No. 10 2009 042 123.8, filed Sep. 18, 2009, entitled "SURVEYING INSTRUMENT AND A METHOD THEREFOR," the contents of which is hereby incorporated by reference in its entirety.

BACKGROUND OF THE INVENTION

The present invention relates to surveying instruments and methods for operating surveying instruments. In particular, the invention relates to a surveying instrument, which comprises a measuring system, wherein an inclination angle of the measuring system is adjustable.

For conducting measurements using surveying instruments, it may be necessary to carry out a leveling of a measuring system of the surveying instrument prior to its use. In other words, a predetermined axis of the measuring system is aligned along or perpendicular to the gravity vector. A surveying instrument may for example be a theodolite, a tachymeter (total station, in particular a video tachymeter), a leveling instrument or a laser scanner. However, the present invention is not limited to such devices.

Commonly, bubble levels are used for performing the leveling process. These bubble levels comprise a hollow body or bubble vial, which is made of glass or plastics and which is filled with a liquid and a gas bubble. At the hollow body or bubble vial, marks are provided, which allow to determine the position of the gas bubble within the hollow body or bubble vial. During the leveling process, the inclination of the measuring system is adjusted, until the gas bubble is located at a certain position. Different shapes of bubble levels are available, such as circular levels or bull's eye levels, tubular levels and striding levels.

SUMMARY OF THE INVENTION

It is an object to provide a surveying instrument and a method for operating a surveying instrument, which allows a faster and more efficient leveling process of the measurement device of the surveying instrument.

In the present application, the terms "geodesy" and "geodetic" are not limited to the field of measurement and imaging of the earth's surface, including the sea bed, but have to be broadly understood in the sense of measurement of the dimension and position of objects.

A surveying instrument, comprising: a measuring system having a component; a support; a mounting unit, which is arranged at the support, wherein the component is mounted on the mounting unit and wherein the support and the mounting unit are configured such that the mounting unit is adjustable relative to the support; a fine inclination sensor, which is arranged at the component of the measuring system and which is configured to measure an inclination angle of the component of the measuring system and to output fine inclination data which correspond to the inclination angle; a coarse inclination sensor, which is arranged at the component of the measuring system and which is configured to measure the inclination angle and to output coarse inclination data, which correspond to the inclination angle, wherein the coarse inclination sensor comprises an electronic acceleration sensor; an evaluation unit, which is configured to select inclination data of the measuring system from the coarse inclination data and fine inclination data; and an output unit, which is configured to output the inclination data of the measuring system.

The surveying instrument comprises a measuring system, having a component, such as a theodolite, a tachymeter (like a total station, in particular a video tachymeter), a leveling instrument or a laser scanner. However, the component of the measuring system is not limited to such kinds of devices. The measuring system may comprise more than one component, wherein each of the components is individually adjustable.

Furthermore, the leveling instrument comprises a support and a mounting unit, wherein the measuring system is mounted on the mounting unit. For example, the mounting unit may be configured as a plate onto which the measuring system is mounted by screws. It is also conceivable, that the measuring system is mounted on or mountable on the mounting unit such that the measuring system is rotatable, turnable or swivelable about an axis, which is oriented along a vertical direction.

By moving the mounting unit relative to the support, the inclination angle of the component of the measuring system is adjustable. The measuring system may comprise one or more components. The measuring system may comprise two or more components which are adjustable in their position and orientation relative to each other. For example, the measuring system may comprise a measuring system support, at which a range finder is arranged as a further component such that this further component is turnable about a tilting axis.

The support may comprise a stand. The stand may comprise a plurality of legs, wherein the length of each of the legs is individually adjustable. For example, the stand may be configured as a tripod. Additionally or alternatively, the support may comprise a clamping stand. The clamping stand may be fastened to another object by using screws.

The inclination angle of the component of the measuring system may be defined as the angle, which is formed between a defined axis of the component of the measuring system and the gravity vector. For minimizing the inclination angle, the defined axis of the measuring system is aligned along the gravity vector. Thereby, the component of the measuring system is leveled.

The surveying instrument further comprises a fine inclination sensor and a coarse inclination sensor. The fine inclination sensor is configured to measure the inclination angle. The fine inclination data, which are output by the fine inclination sensor correspond to the inclination angle. In other words, the fine inclination data represent the value of the inclination angle with an accuracy of the fine inclination sensor.

The coarse inclination sensor is configured to measure the inclination angle and to output coarse inclination data. The coarse inclination data, which are output by the coarse inclination sensor correspond to the inclination angle. In other words, the coarse inclination data represent the value of the inclination angle with an accuracy of the coarse inclination sensor.

Fine inclination data may be defined as data, which have a higher accuracy compared to the coarse inclination data. In other words, the accuracy of the fine inclination sensor may be higher than the accuracy of the coarse inclination sensor.

The working range of the fine inclination sensor may be different from the working range of the coarse inclination sensor. In particular, the working range of the fine inclination sensor may be narrower than the working range of the coarse inclination sensor. The working range of the fine inclination sensor may be within the working range of the coarse inclination sensor.

The working range of the fine inclination sensor may overlap with the working range of the coarse inclination sensor.

Thereby, it is possible to provide an increased working range for measuring inclination data combined with a high accuracy. Fine inclination data may only be determined within a predetermined working range, in which a high accuracy of adjusting the inclination angle of the measuring system is desired. In particular, the working range of the fine inclination sensor may be located in an angular range around the inclination angle "zero". Thereby, a leveling of the component of the measuring system may be performed with a high accuracy.

For example, the working range of the coarse inclination angle may be from −10 degrees to +10 degrees. In further embodiments, the coarse inclination sensor may comprise a working range from
−20 degrees to +20 degrees or from
−30 degrees to +30 degrees.

The accuracy of the coarse inclination angle may be 6 minutes. In other words, the absolute difference between the coarse inclination data and the inclination angle may be less than 6 minutes.

In further embodiments, the accuracy of the fine inclination sensor may be ±0.5 minutes or ±0.3 minutes.

The invention is not limited to embodiments with two inclination sensors. For example, it is also conceivable, that the surveying instrument comprises more than two, in particular three or four inclination sensors. The inclination sensors may be different from each other in at least one of accuracy and working range. The measuring system may comprise two or more components, wherein the components are adjustable relative to each other. Each of the component may comprise a coarse inclination sensor and a fine inclination sensor.

The surveying instrument further comprises an evaluation unit, which is configured to select inclination data of the measuring system from the determined coarse inclination data and fine inclination data. In case the surveying instrument comprises more than two inclination sensors, the evaluation unit may be configured to select inclination data of the measuring system from inclination data of each of the inclination sensors.

According to an embodiment, the evaluation unit is configured to select the inclination data of the measuring system from the coarse inclination data and the fine inclination data depending on at least one of the coarse inclination data and fine inclination data.

The selecting may be performed based on criteria. The criteria may be predetermined or preselectable. For example, the criteria may depend on at least one of the coarse inclination data which are output by the coarse inclination sensor and the fine inclination data which are output by the fine inclination sensor. In other words, the evaluation unit may read the coarse inclination data and the fine inclination data and may decide based on at least one of the fine inclination data and coarse inclination data, whether to select the inclination data of the measuring system from the coarse inclination data or from the fine inclination data.

According to an embodiment, the evaluation unit is configured to compare at least one of the coarse inclination data and fine inclination data to at least one predetermined or preselectable threshold. By way of example, the threshold may represent a limit of a working range of the fine inclination sensor. Additionally or alternatively, the threshold may represent an accuracy of a measurement, which is to be performed by the measuring system. It is further conceivable that the evaluation unit is configured to average, integrate or calculate a time derivation based on at least one of the fine inclination data and coarse inclination data.

According to an embodiment, the evaluation unit is configured to select the inclination data of the measuring system from between fine inclination data and coarse inclination data, which correspond to the same point of time. In other words, the evaluation unit may be configured to select the inclination data of the measuring system from either the coarse inclination data, which correspond to the inclination angle at a point of time or from the fine inclination data, which correspond, to the inclination angle at the same point of time. The inclination data of the measuring system selected from the coarse inclination data or fine inclination data may then correspond to that point of time.

According to an embodiment, the evaluation unit selects the inclination data of the measuring system from the coarse inclination data when at least one of coarse inclination values which are represented by the coarse inclination data and fine inclination values, which are represented by the fine inclination data are outside of a working range of the fine inclination sensor. In other words, the evaluation unit may select the inclination data of the measuring system from the coarse inclination data when the coarse inclination values and/or the fine inclination values are outside of the working range of the fine inclination sensor.

According to a further embodiment, the evaluation unit selects the inclination data of the measuring system from the fine inclination data when at least one of the values of the coarse inclination data and the values of the fine inclination data are within the working range of the fine inclination sensor. In other words, the evaluation unit may perform a selection from the fine inclination data when the coarse inclination values and/or the fine inclination values are within the working range of the fine inclination sensor. The working range of the fine inclination sensor may be defined as a range, in which the fine inclination data which are output by the fine inclination sensor represent the inclination data with a predetermined accuracy.

According to an embodiment, the evaluation unit is configured to select the inclination data of the measuring system from the fine inclination data when coarse inclination values represented by the coarse inclination data are within a working range of the fine inclination sensor, and to select the inclination data of the measuring system from the coarse inclination data when fine inclination values represented by the fine inclination data are outside of the working range.

According to an embodiment, the evaluation unit is configured to be switchable between an operating mode "selecting from coarse inclination data" and an operating mode "selecting from fine inclination data". The evaluation unit may comprise a switch. The user may switch between these operating modes by operating the switch.

Furthermore, the surveying instrument comprises an output unit. The output unit may comprise a display.

Thereby, a surveying instrument is provided which selects inclination data of the measuring system from the fine inclination data and coarse inclination data and displays the inclination data to the user. Thereby, it is possible to adjust the component of the surveying instrument at a high accuracy and with a high working range. Also thereby, the inclination data of the measuring system is automatically selected without requiring the user to pay attention to a plurality of inclination sensors. The surveying instrument therefore allows a faster and more efficient process of adjusting the inclination angle of the component of the measuring system.

Furthermore, since the coarse inclination sensor comprises an electronic acceleration sensor, a circular level may be omitted. Circular levels are typically top viewable and therefore difficult to be read by the user. Furthermore, the working range of a circular level is typically smaller than a range of adjustment of a tribrach. Typically, the working range of a circular level ranges from −30 minutes to +30 minutes, i.e. between ±0.5 degrees. In other words, the circular level covers a range of motion of ±30 minutes, i.e. ±0.5 degrees. On the other hand, a tribrach typically provides a range of adjustment ranging from −3 degrees to +3 degrees, which therefore exceeds the working range of the circular level. However, by using an electronic acceleration sensor, the working range is increased, for example to up to ±10 degrees. Thereby, the working range of the electronic acceleration sensor covers the range of adjustment of the tribrach.

Thereby, the user is able to determine a direction of adjustment in the leveling process even at large deviations from the leveled position. Furthermore, electronic acceleration sensors are more robust and cheaper since they do not contain a liquid. Furthermore, it is possible to electronically calibrate the acceleration sensor. Thereby, it is not necessary to carry out a complicated mechanical calibration procedure. Consequently, the surveying instrument allows a faster and easy to handle leveling of the component of the measuring system. Furthermore, the surveying instrument is easy to manufacture.

According to an embodiment, the support further comprises a tribrach having leveling screws, wherein the tribrach is configured such that the mounting unit which is mounted on the tribrach is adjustable relative to the support by turning the leveling screws.

According to an embodiment, the fine inclination sensor comprises: a light source, a lens, a light sensitive sensor, a liquid, and a vessel, which contains the liquid, wherein the fine inclination data are determined by detecting a light beam of the light source, which is reflected from the liquid by the light sensitive sensor.

With respect exemplary arrangements of the light source, the lens, the vessel and the light sensitive sensor, it is referred to U.S. Pat. No. 7,388,658 of Glimm, the contents of which is incorporated herein by reference in its entirety. The embodiments of the fine inclination sensor which are described in U.S. Pat. No. 7,388,658 of Glimm may be combined with the surveying instrument described in this application.

According to an embodiment, the electronic acceleration sensor is configured to determine the coarse inclination data by measuring an acceleration along at least one direction of the electronic acceleration sensor.

The electronic acceleration sensor may be configured as a 1-axis, a 2-axis or a 3-axis acceleration sensor. In other words, the electronic acceleration sensor may be configured to determine the coarse inclination data by measuring an acceleration along one, two or three directions of the acceleration sensor, wherein the directions are non-parallel.

According to a further embodiment, the fine inclination sensor is configured to determine the fine inclination data by measuring an acceleration along at least two non-parallel axes of the fine inclination sensor.

The acceleration may be caused by gravity. By measuring the acceleration along an axis of the coarse acceleration sensor, an acceleration is measured, which corresponds to the projection of the gravity vector along the axis. Therefore, by measuring the acceleration along two non-parallel axes of the coarse inclination sensor, the projection of the acceleration vector onto a plane is measured, wherein the plane is defined by the two non-parallel axes. This correspondingly applies to the measuring of the acceleration along the two non-parallel axes of the fine inclination sensor.

The non-parallel axes of the coarse inclination sensor may be oriented perpendicular to each other. This correspondingly applies to the two non-parallel axes of the fine-inclination sensor.

According to an embodiment, the surveying instrument further comprises an automatic adjustment unit, and the support further comprises an actuator, wherein the automatic adjustment unit is configured such that depending on at least one of the coarse inclination data, the fine inclination data and the inclination data of the measuring system, the mounting unit is adjusted relative to the support by the actuator which is controlled by the automatic adjustment unit.

The actuator may comprise one or more stepper motors.

By an automatic adjustment depending on at least one of the fine inclination data, the coarse inclination data and the selected inclination data, it is possible for the user to perform an automatic leveling of the surveying instrument by operating a switch.

According to a further embodiment, at least one of the fine inclination sensor and the coarse inclination sensor comprises a MEMS chip, wherein the MEMS chip includes a mass, which is deflectable.

According to a further embodiment, the evaluation unit is further configured to determine a scale depending on at least one of the fine inclination data and the coarse inclination data, and wherein the output unit is further configured to display a graphical representation of the scale.

The scale may be defined such that a value is assigned to at least one of a length and a number of pixels on a surface of the display. The surface of the display may be a screen. The value may be the inclination angle of the measuring system. The graphical representation of the scale may comprise graduations, which indicate values of the inclination angle of the measuring system. Thereby, the scale is made visible to the user by the output unit. It is also conceivable, that the scale is displayed by at least one of a circle, an ellipse, a plurality of concentric circles and a plurality of concentric ellipses.

The scale may be selected from a group of predetermined scales. It is also conceivable, that the scale is automatically calculated depending on at least one of the fine inclination data and the coarse inclination data.

The scale may be determined depending on at least one of the fine inclination data and the coarse inclination data corresponding to a current point in time. Additionally or alternatively, the scale may be determined based on at least one of the fine inclination data and the coarse inclination data, corresponding to an earlier point in time.

The determining of the scale may also comprise averaging at least one of the fine inclination data and coarse inclination data over an averaging time. Furthermore, it is conceivable, that a time derivation at least one of the fine inclination data and coarse inclination data is determined, wherein the determining of the scale is performed depending on the determined time derivation. For example, a fast increase of the coarse inclination values or fine inclination values may be determined and a wider scale may be determined for preventing a frequent change of the graphical representation of the scale on the display. This provides an easy-to-read displaying of the inclination data to the user.

According to an embodiment, the output unit is further configured to output the inclination data of the measuring system by displaying at least one of a circle and an ellipse relative to the graphical representation of the scale.

The displaying of the circle or the ellipse relative to the graphical representation of the scale may be such that it is perceived by the user as a gas bubble of a circular level or of a tubular level. Thereby, an easy-to-read presentation of the measured inclination data is achieved.

According to an embodiment, the evaluation unit is configured to determine at least one of the inclination data of the measuring system and the scale depending on a predetermined or preselectable inclination accuracy of the measuring system.

The inclination accuracy may be defined as an angular range, which represents the accuracy of adjustment of the inclination angle, which is to be achieved. By way of example, the inclination accuracy may be ±1 minute, i.e. the absolute difference between the inclination data of the measuring system and the inclination angle is less than 1 minute. The inclination accuracy may for example depend on the measuring system or on the purpose for which the data, which is to be measured by the measuring system, is used. For example, a preliminary measurement may be carried out by the user for deciding, whether or not measurements with a higher accuracy shall be further carried out, wherein the measurements with the higher accuracy require an advanced and more time consuming leveling process.

By adjusting the accuracy of inclination, an adjustment of the inclination angle may be performed in an efficient way with the required desired accuracy of inclination.

According to a further embodiment, the output unit comprises a display having a backlight.

The backlight of the display allows an adjustment of the inclination angle under poor lighting conditions. Thereby, an improved readability of the inclination data compared to the circular level is obtained.

According to embodiments, there is provided a method of adjusting an inclination angle of a component of a measuring system of a surveying instrument, wherein the component of the measuring system is mounted on a mounting unit of the surveying instrument, comprising: determining coarse inclination data which correspond to the inclination angle by using a coarse inclination sensor; determining fine inclination data, which correspond to the inclination angle by using a fine inclination sensor; determining, by using an evaluation unit, inclination data of the measuring system by selecting the inclination data of the measuring system from the determined fine inclination data and coarse inclination data; and outputting the inclination data of the measuring system.

According to an embodiment, the selecting the inclination data of the measuring system from the determined fine inclination data and coarse inclination data comprises: selecting the inclination data of the measuring system from the fine inclination data and coarse inclination data depending on at least one of the determined fine inclination data and the determined coarse inclination data.

According to a further embodiment, the selecting the inclination data of the measuring system from the determined fine inclination data and coarse inclination data comprises: selecting the inclination data of the measuring system from the fine inclination data when coarse inclination values represented by the determined coarse inclination data are within a working range of the fine inclination sensor, and selecting the inclination data of the measuring system from the coarse inclination data when fine inclination values represented by the determined fine inclination data are outside of the working range.

According to an embodiment, the method further comprises: determining a scale depending on at least one of the fine inclination data, the coarse inclination data and the inclination data, wherein the outputting of the inclination data of the measuring system comprises displaying a graphical representation of the scale.

According to an embodiment, the determining the scale comprises selecting the scale from a group of predetermined scales.

According to an embodiment, the outputting of the inclination data of the measuring system comprises displaying at least one of a circle and an ellipse relative to the graphical representation of the scale.

According to an embodiment, the method further comprises: setting an inclination accuracy of the measuring system, wherein the determining of the inclination data of the measuring system is performed depending on the set inclination accuracy.

Additionally or alternatively, the determining of the scale may be performed depending on the set inclination accuracy of the measuring system.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

Exemplary embodiments of the invention are explained in the following by referring to the figures.

DETAILED DESCRIPTION OF SPECIFIC EMBODIMENTS

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

Figure 1:
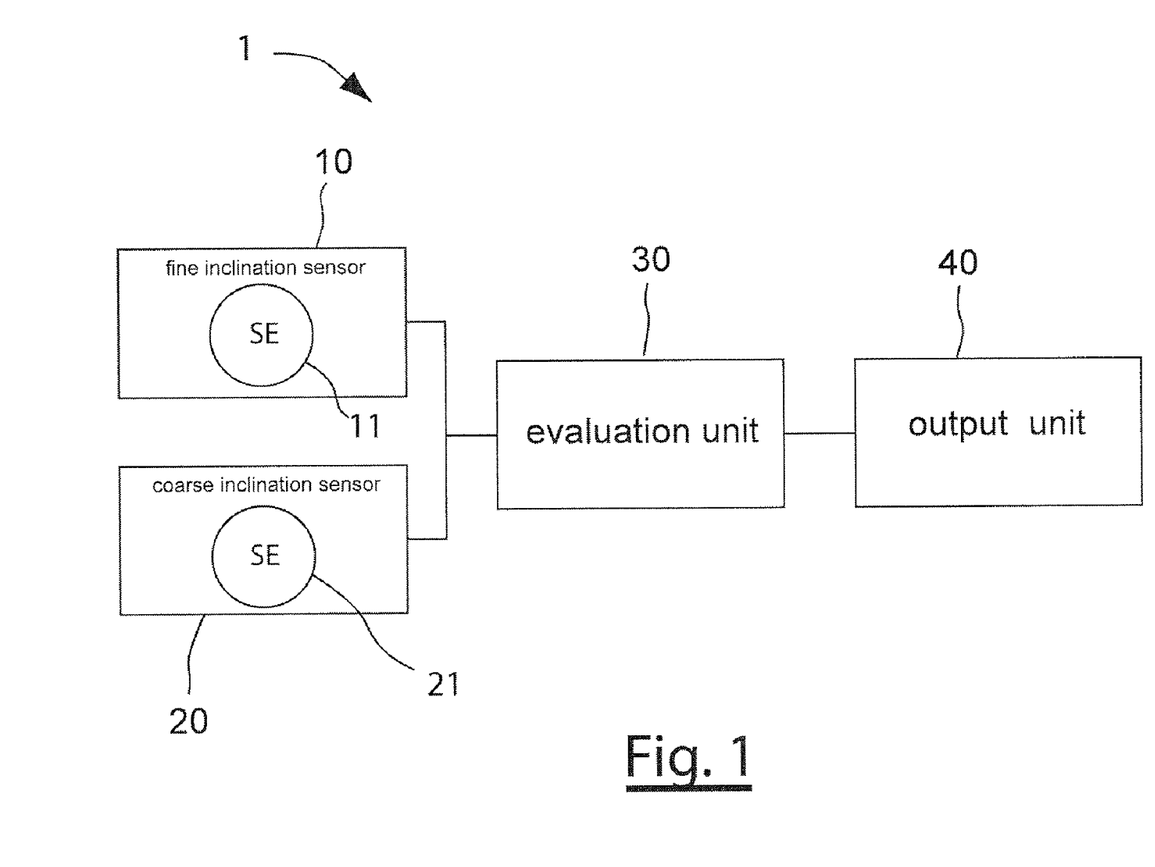
FIG. 1 shows a schematic illustration of a surveying instrument according to an exemplary embodiment.

A surveying instrument 1, which is schematically illustrated in FIG. 1 comprises a fine inclination sensor 10 and a coarse inclination sensor 20. The fine inclination sensor 10 comprises a sensor element 11. The coarse inclination sensor 20 comprises a sensor element 21, which is an electronic acceleration sensor. It is conceivable, that also the sensor element 11 of the fine inclination sensor 10 is an electronic acceleration sensor. At least one of the sensor element 11 of the fine inclination sensor 10 and the sensor element 21 of the coarse inclination sensor 20 may be a 1-axis, 2-axis or 3-axis acceleration sensor element. Each of the fine inclination sensor 10 and coarse inclination sensor 20 is connected in signal communication with an evaluation unit 30 of the surveying instrument 1. At least one of the fine inclination sensor 10 and the coarse inclination sensor 20 may comprise two or more sensor elements.

The fine inclination sensor 10 provides fine inclination data to the evaluation unit 30. The fine inclination data correspond to the inclination angle, which is to be measured. The coarse inclination sensor 20 provides coarse inclination data to the evaluation unit 30. The coarse inclination data correspond to the inclination angle, which is to be measured. The evaluation unit is configured to determine inclination data of the measuring system which represent the inclination angle based on the fine inclination data and the coarse inclination data.

The evaluation unit 30 decides, whether inclination data of the measuring system is determined based on the fine inclination data or the coarse inclination data. In other words, the evaluation unit selects from between fine inclination data and coarse inclination data, which are provided to the evaluation unit 30. The selected data may represent the inclination data of the measuring system.

The evaluation unit 30 may comprise an electronic circuit, which is configured to select from between the fine inclination data and coarse inclination data. The circuit may for example comprise a comparator circuit, which compares at least one predetermined or preselectable threshold value to at least one of fine inclination values which are represented by the fine inclination data and coarse inclination values, which are represented by the coarse inclination data. The threshold value may represent a limit of a working range of the fine inclination sensor. Additionally or alternatively, the threshold value may represent an accuracy of a measurement which is to be performed by the measuring system.

Additionally or alternatively, the evaluation unit 30 may comprise a microprocessor and a memory. The evaluation unit 30 may further comprise a computer program stored in the memory. The computer program, when executed by the microprocessor, may cause the microprocessor to select inclination data of the measuring system from the fine inclination data and coarse inclination data. By way of example, the computer program may be configured to compare at least one of the fine inclination values and coarse inclination values to the at least one threshold value.

An output unit 40 of the surveying instrument 1 is connected in signal communication with the evaluation unit 30. The inclination data of the measuring system are forwarded from the evaluation unit 30 to the output unit 40. The output unit 40 is configured to output the inclination data to a user.

At least one of the sensor element 11 of the fine inclination sensor 10 and the sensor element 21 of the coarse inclination sensor 20 may be a chip-based sensor. The chip-based sensor may be a MEMS chip. The MEMS chip may comprise a mass, wherein a deflection of the mass from a resting position is measurable by the chip. The deflection of the mass from its resting position may be caused by gravity. The fine inclination data or coarse inclination data may be determined from at least one of an amount and a direction of the deflection of the mass from its resting position.

For example, the chip LIS3LV02DQ, which is a 3-axis accelerometer commercially available from STMicroelectronics may be used as the electronic acceleration sensor.

Figure 2:
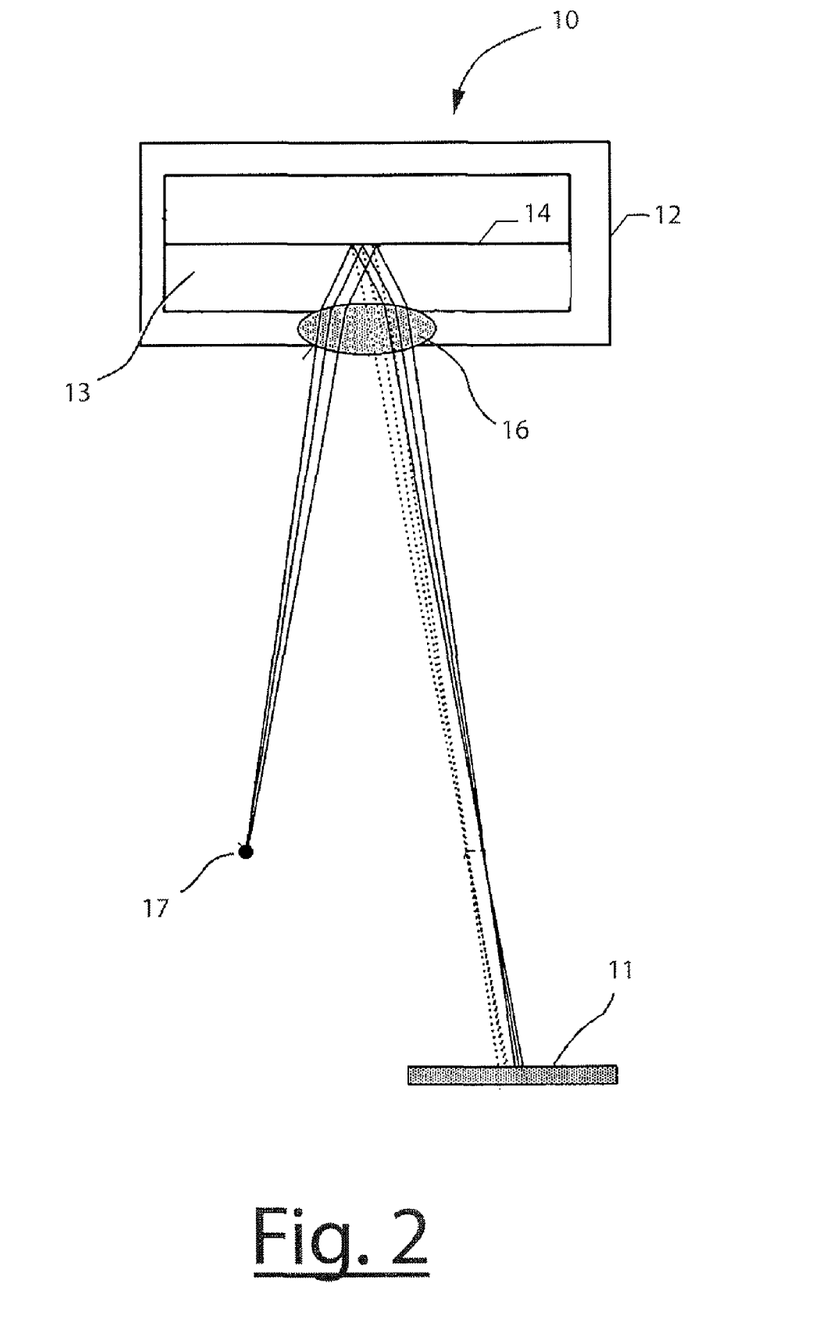
FIG. 2 shows a schematic illustration of a fine inclination sensor according to an exemplary embodiment.

FIG. 2 schematically shows the setup of a fine inclination sensor 10, as it may be used in an exemplary embodiment of the surveying instrument.

With respect to further variants of this exemplary embodiment, it is referred to U.S. Pat. No. 7,388,658 of Glimm, the contents of which is incorporated herein by reference in its entirety.

The fine inclination sensor 10 comprises a vessel 12, which contains a liquid 13. The liquid 13 comprises a free surface 14 within the vessel 12. The free surface 14 may be an upper surface of the liquid 13. The free surface may represent an interface of the liquid and a gas. The free surface 14 is substantially located in a focal plane 15 of a lens 16, when the surveying instrument 1 is in a non-inclined state. The fine inclination sensor 10 further comprises a light sensitive sensor 11. The light source 17, the lens 16 and the light sensitive sensor 11 are arranged such that the light beam, which is emitted from the light source 17, traverses the lens 16 and is directed to the free surface 14. The light beam is reflected from the free surface 14, traverses the lens 16 and is directed onto the light sensitive sensor 11.

Figure 3A:
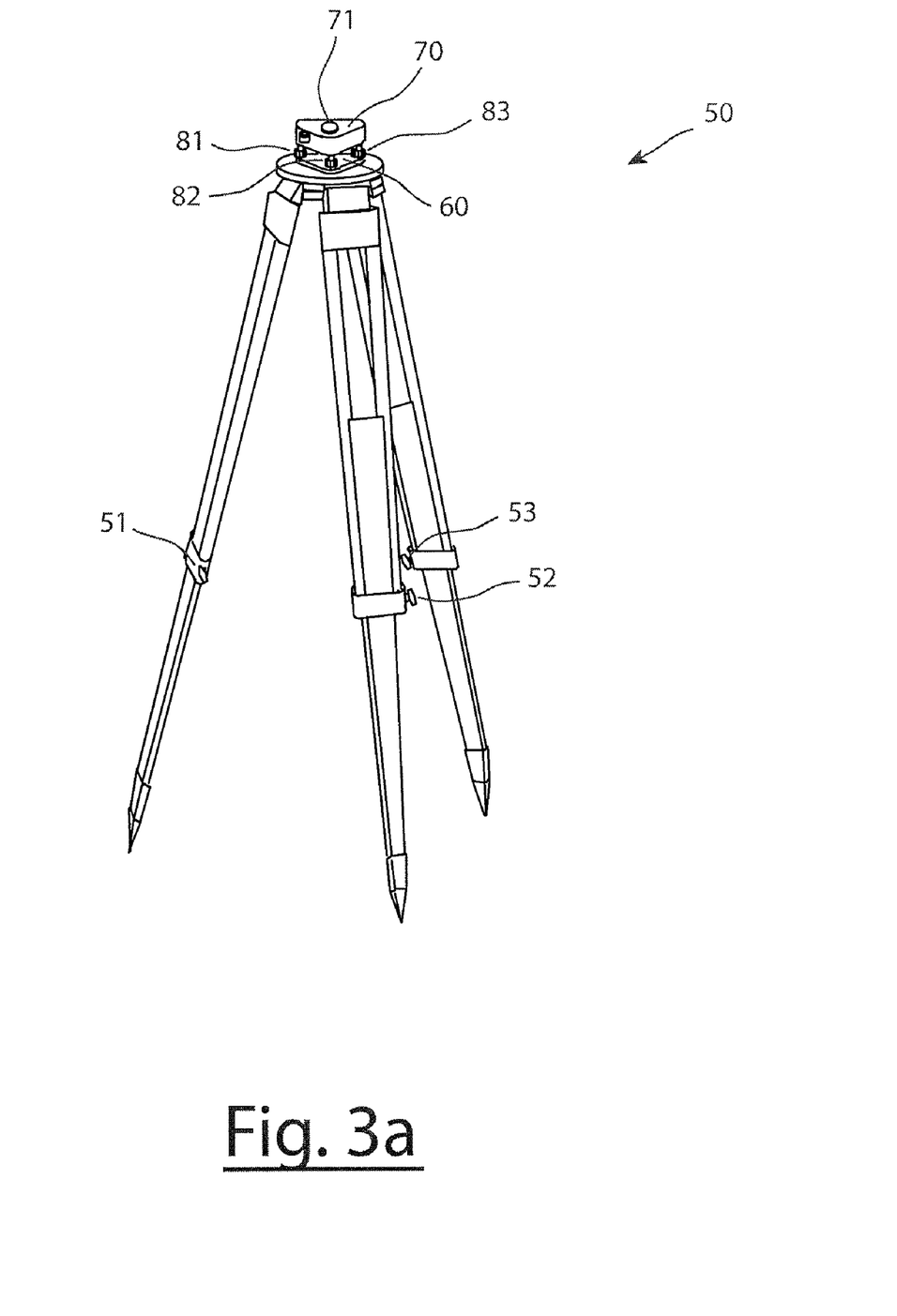
FIG. 3a shows a perspective view of a support having a supporting plate and a tribrach as it may be used in embodiments of the surveying instrument.

FIG. 3a shows a perspective view of a support 50, as it may be used in exemplary embodiments of the surveying instrument 1. The support 50 is configured as a stand having a supporting plate 60 and a tribrach 70. The tribrach 70 comprises a supporting plate 60 and leveling screws 81, 82, 83. A mounting unit 71 for mounting a measuring system (not illustrated in FIG. 3a) onto the support 50 is mounted on the tribrach 70. The tribrach 70, the leveling screws 81, 82, and 83 and the supporting plate 60 are configured such that an inclination of the mounting unit 71 is adjustable by turning the leveling screws 81, 82 and 83. Furthermore, the support 50 comprises fastening screws 51, 52 and 53 which are arranged at each of legs of the stand. By operating the fastening screws 51, 52 and 53, the lengths of each of the legs of the stand are adjustable. By adjusting the lengths of the legs, the inclination of the mounting unit 71 is coarsely adjustable.

Figure 3B:
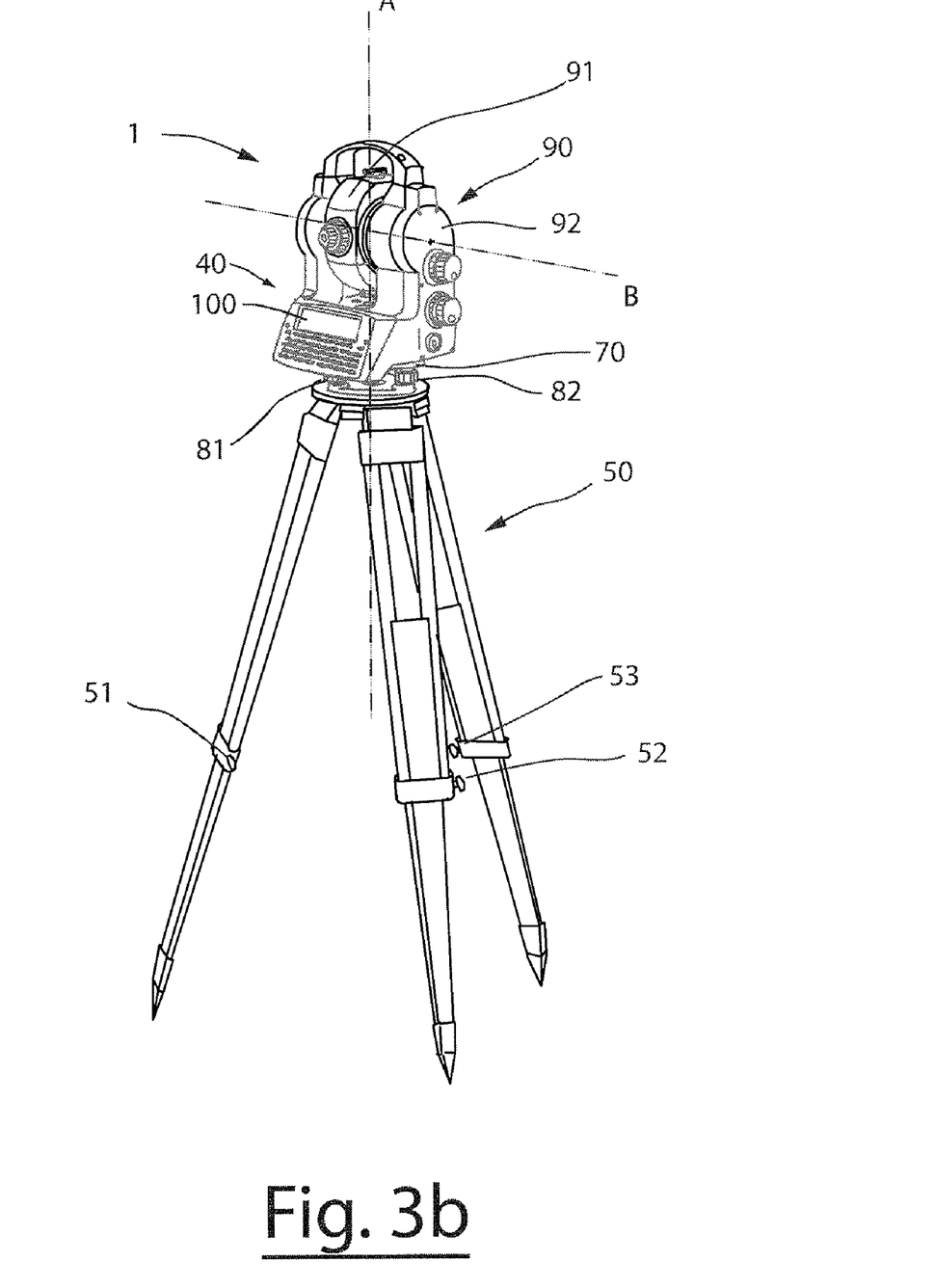
FIG. 3b shows a perspective view of a surveying instrument according to an exemplary embodiment.

FIG. 3b shows a perspective view of a surveying instrument 1 according to an exemplary embodiment. A measuring system 90 is mounted onto a tribrach 70 via a mounting unit (not illustrated in FIG. 3b). The measuring system comprises an output unit 40, which comprises a display 100. The display 100 is mounted on the measuring system 90. The user may easily read inclination data which are displayed on the display 100 without having to pay attention simultaneously to a plurality of sensors located at different positions. Furthermore, the display 100 may comprise a backlight, such that even under poor lighting conditions, an adjustment of the inclination angle of the measuring system 90 is possible. The measuring system 90 is configured such that it is turnable or swivelable about a first axis A, which is oriented along a vertical direction. Furthermore, the measuring system 90 comprises a measuring system support 92, which is configured such that a rating meter 91 of the measuring system 90 is tiltably supported about a second axis B, which is oriented along a horizontal direction.

Figure 4:
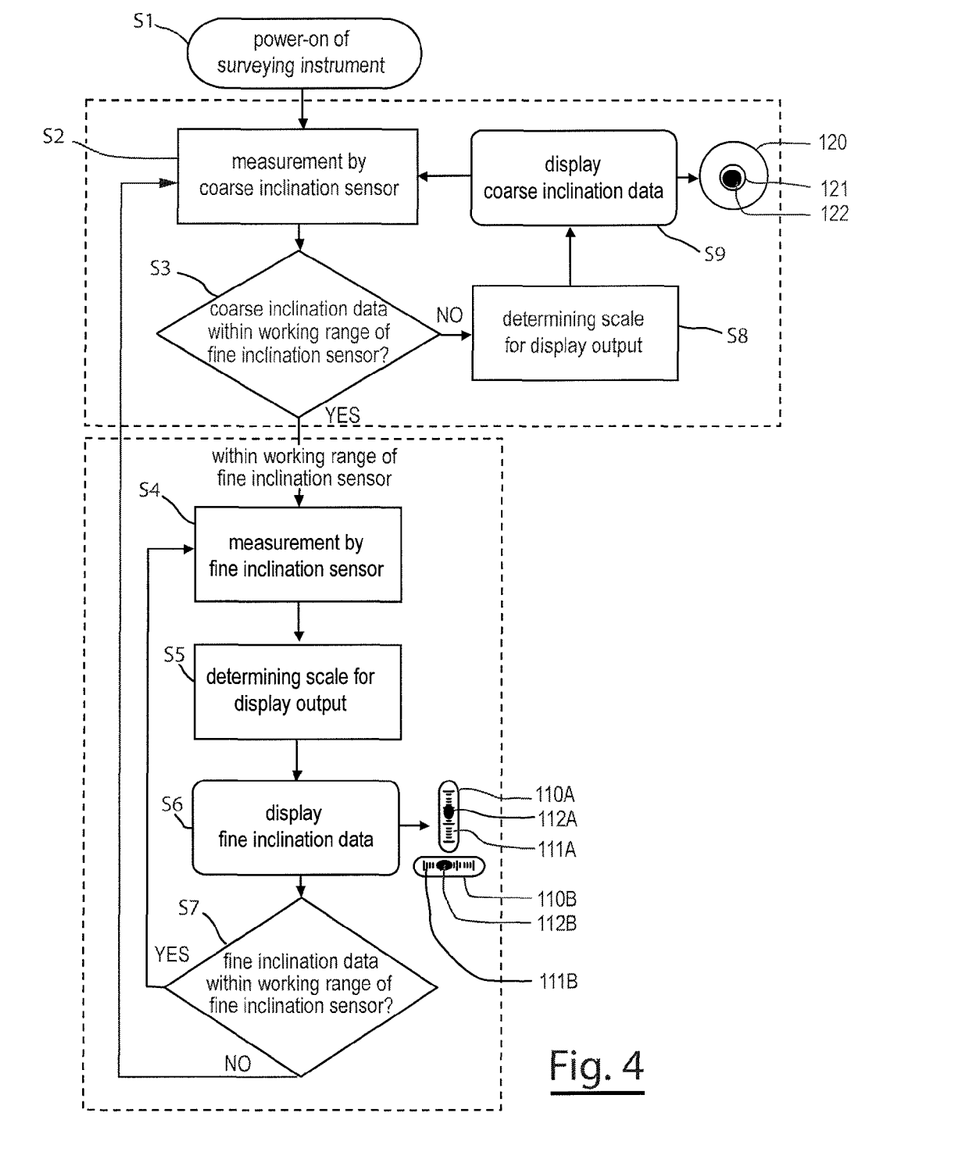
FIG. 4 shows a flow chart, which illustrates the determining and outputting of the inclination data of a measuring system of a surveying instrument according to an exemplary embodiment.

FIG. 4 shows a flow chart, which illustrates the determining and outputting of the inclination data, of a surveying instrument 1, as illustrated in FIG. 1 according to an exemplary embodiment.

After powering up (S1) the surveying instrument 1, the coarse inclination sensor 20 measures (S2) the inclination angle of a component of the measuring system of the surveying instrument 1 and outputs coarse inclination data to the evaluation unit 30. In case the coarse inclination data are outside of a working range of the fine inclination sensor 10 (S3: NO), the evaluation unit 30 determines (S8) a scale depending on the coarse inclination data. The evaluation unit 30 further selects inclination data of the measuring system from the measured coarse inclination data and the output unit 40 displays (S9) the inclination data of the measuring system on a display of the surveying instrument 1.

A graphical representation of the determined scale is displayed on the display. The graphical representation of the scale comprises two unfilled concentric circles 120, 121. The two unfilled concentric circles 120, 121 represent graduations, which indicate values of the inclination angle. The displaying of the inclination data comprises displaying a filled circle 122 relative to the unfilled concentric circles 120, 121. A position of the filled circle 122 relative to the concentric unfilled circles 120, 121 indicates the inclination of a plane relative to the gravity vector. The unfilled concentric circles 120, 121 and the filled concentric circle 122 are perceived by the user as a circular bubble.

In case the coarse inclination data are within the working range of a fine inclination sensor 10 of the surveying instrument 1 (S3: YES), the inclination data of the measuring system are selected from fine inclination data. The inclination angle is measured (S4) by the fine inclination sensor 10 and fine inclination data is output to the evaluation unit 30. The evaluation unit (30) selects inclination data of the measuring system from the fine inclination data. A scale is determined (S5) based on the fine inclination data.

The fine inclination data, which represent the selected inclination data of the measuring system, are displayed (S6) on the display. The displaying of the fine inclination data comprises displaying a graphical representation of a first scale 110A and a graphical representation of a second scale 110B. Each of the first scale 110A and second scale 110B represent an axis of the fine inclination sensor. The two axes are oriented perpendicular to each other. Each of the graphical representations of the first and second scales 110A, 110B comprises graduations 111A, 111B, which indicate values of the inclination angle. Furthermore, the outputting of the inclination data of the measuring system comprises displaying a first ellipse 112A relative to the graphical representation of the first scale 110A and displaying a second ellipse 112B relative to the graphical representation of the second scale 110B. A position of the first ellipse 112A relative to the graphical representation of the first scale 110A indicates the inclination of the component along the axis of the first scale 110A. A position of the second ellipse 112B relative to graphical representation of the second scale 110B indicates the inclination of the component along the axis of the second scale 110B. The ellipses 112A, 112B and the graphical representation of the scales 110A, 110B indicate the inclination of a plane relative to the gravity vector, wherein the plane is defined by the axes of the first and second scale 110A, 110B. The ellipses 112A, 112B and the scales 110A, 110B are perceived by the user as two tubular bubbles, which are oriented perpendicular to each other.

In case the fine inclination data are within the working range of the fine inclination sensor 10 (S7: YES), the fine inclination sensor measures (S4) the inclination angle. The fine inclination data determined by the fine inclination sensor are used for determining a new scale (S5) and the inclination data of the measuring system are selected from the fine inclination data. In case the fine inclination data are outside of the working range of the fine inclination sensor 10 (S7: NO), coarse inclination data, which are determined by the coarse inclination sensor measuring (S2) the inclination angle, are used for determining (S8) the scale. The inclination data of the measuring system are selected from the coarse inclination data and displayed (S9) on the display.

Thereby, inclination data of the measuring system are selected from the fine inclination data in case coarse inclination values, which are represented by the determined coarse inclination data are within the working range of the fine inclination sensor 10. Furthermore, inclination data of the measuring system are selected from the coarse inclination data when fine inclination values which are represented by the determined fine inclination data are outside of the working range of the fine inclination sensor 10.

Figure 5:
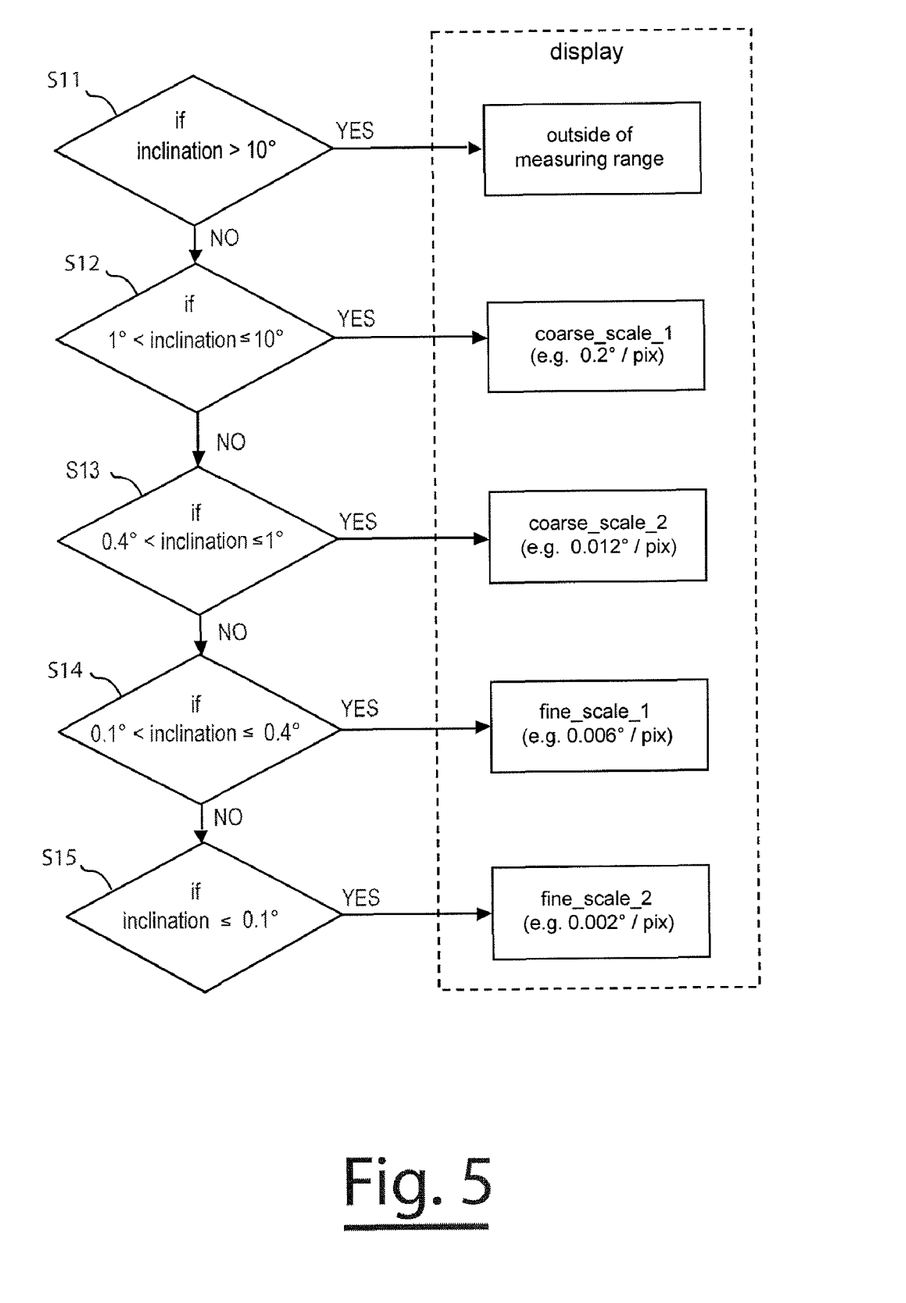
FIG. 5 shows a flow chart, which illustrates the determining of a scale according to an exemplary embodiment.

FIG. 5 shows a flow chart, which illustrates the determining of a scale according to an exemplary embodiment. In particular, the method, which is illustrated in this flow chart may be carried out in stages (S5) and (S9) in FIG. 4.

According to the exemplary method, which is illustrated in FIG. 5, a scale is selected from a group of predetermined scales depending on in which range the inclination data are. In case a value of the inclination data of the measuring system exceeds the value of 10 degrees (S11: YES), a message "outside the working range" is shown on the display. In case the value of the inclination data of the measuring system has a value smaller than or equal to 10 degrees and greater than 1 degree (S12: YES), a predetermined scale having the label "coarse_scale_1" is selected for display on the display. At this scale, a pixel of the display corresponds to 0.2 degrees. In case the value of the inclination data of the measuring system is not within in this range (S12: NO) but has a value greater than 0.4 degrees and smaller than or equal to 1 degree (S13: YES), a scale being labeled "coarse_scale_2" is selected for display on the screen. At this scale, a pixel of the display corresponds to an angle of 0.012 degrees. In case the value of the inclination data is not within this range (S13: NO) but has a value greater than 0.1 degrees and smaller than or equal to 0.4 degrees (S14: YES), a scale being labeled "fine_scale_1" is selected for display on the screen. At this scale, a pixel of the display corresponds to an angle of 0.006 degrees. In case the value of the inclination data of the measuring system is not located in this range (S14: NO) but has a value smaller than or equal to 0.1 degrees (S15: YES) a scale being labeled "fine_scale_2" is selected. At this scale, a pixel of the display corresponds to an angle of 0.002 degrees.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surveying instrument, comprising:
    a measuring system having a component;
    a support;
    a mounting unit, which is arranged at the support, wherein the component is mounted on the mounting unit and wherein the support and the mounting unit are configured such that the mounting unit is adjustable relative to the support;
    a fine inclination sensor, which is arranged at the component of the measuring system and which is configured to measure an inclination angle of the component of the measuring system and to output fine inclination data which correspond to the inclination angle;
    a coarse inclination sensor, which is arranged at the component of the measuring system and which is configured to measure the inclination angle and to output coarse inclination data, which correspond to the inclination angle, wherein the coarse inclination sensor comprises an electronic acceleration sensor;
    an evaluation unit, which is configured to select inclination data of the measuring system from the coarse inclination data and fine inclination data;
    wherein the evaluation unit is configured to perform the selecting of the inclination data depending on the coarse inclination data and the fine inclination data; and an output unit, which is configured to output the inclination data of the measuring system.

2. The surveying instrument of claim 1, wherein the support further comprises a tribrach having leveling screws, wherein the tribrach is configured such that the mounting unit which is mounted at the tribrach is adjustable by turning the leveling screws.

3. The surveying instrument of claim 1, wherein the fine inclination sensor comprises:
   a light source,
   a lens,
   a light sensitive sensor,
   a liquid, and
   a vessel, which contains the liquid, wherein the fine inclination data are determined by detecting a light beam of the light source, which is reflected from the liquid by the light sensitive sensor.

4. The surveying instrument according to claim 1, wherein at least one of the following holds:
   the coarse inclination sensor is configured to determine the coarse inclination data by measuring an acceleration along at least two non-parallel axes of the electronic acceleration sensor; and
   the fine inclination sensor is configured to determine the fine inclination data by measuring an acceleration along at least two non-parallel axes of the fine inclination sensor.

5. The surveying instrument according to claim 1, wherein the surveying instrument further comprises an automatic adjustment unit, wherein the automatic adjustment unit is configured such that depending on at least one of the coarse inclination data, the fine inclination data and the inclination data of the measuring system, the mounting unit is adjusted relative to the support.

6. The surveying instrument according to claim 1, wherein at least one of the fine inclination sensor and the coarse inclination sensor comprises a MEMS chip, wherein the MEMS chip includes a mass, which is deflectable, as a result of which at least one of the fine inclination data and the coarse inclination data are determined.

7. The surveying instrument according to claim 1, wherein the evaluation unit is further configured to determine a scale depending on at least one of the fine inclination data and the coarse inclination data, and wherein the output unit is further configured to graphically display the inclination data relative to the scale.

8. The surveying instrument according to claim 7, wherein the output unit is further configured to graphically display the inclination data of the measuring system relative to the scale by displaying at least one of a circle and an ellipse which is displaceable relative to the scale.

9. The surveying instrument according to claim 1, wherein the evaluation unit is further configured to determine at least one of the inclination data of the measuring system and the scale depending on a predetermined or predeterminable inclination accuracy of the measuring system.

10. The surveying instrument according to claim 1, wherein the output unit comprises a display having a backlight.

11. A method of adjusting an inclination angle of a component of a measuring system of a surveying instrument, wherein the measuring system is mounted on a mounting unit of the surveying instrument, comprising:
    adjusting the inclination angle by adjusting the mounting unit relative to a support of the surveying instrument;
    determining coarse inclination data which correspond to the inclination angle by using a coarse inclination sensor;
    determining fine inclination data, which correspond to the inclination angle by using a fine inclination sensor;
    determining, by using an evaluation unit, inclination data of the measuring system by selecting the inclination data of the measuring system from the determined fine inclination data and coarse inclination data;
    wherein the selecting of the inclination data of the measuring system from the fine inclination data and coarse inclination data is performed depending on the determined fine inclination data and the determined coarse inclination data; and
    outputting the inclination data of the measuring system.

12. The method according to claim 11, further comprising:
    determining a scale depending on at least one of the fine inclination data, the coarse inclination data and the inclination data,
    wherein the outputting of the inclination data of the measuring system comprises graphically displaying the inclination data relative to the scale.

13. The method according to claim 12, wherein the determining of the scale comprises selecting the scale from a group of predetermined scales.

14. The method according to claim 12, wherein the graphically displaying of the inclination data relative to the scale comprises displaying at least one of a circle and an ellipse on an output unit of the surveying instrument.

15. The method according to claim 11, further comprising:
    setting an inclination accuracy of the measuring system, wherein the determining of at least one of the inclination data of the measuring system and the scale is performed depending on the inclination accuracy.

16. The method according to claim 11, wherein the selecting the inclination data comprises:
    selecting the inclination data of the measuring system from the fine inclination data when coarse inclination values represented by the determined coarse inclination data are within a working range of the fine inclination sensor, and
    selecting the inclination data of the measuring system from the coarse inclination data when fine inclination values represented by the determined fine inclination data are outside of the working range.

* * * * *